(12) United States Patent
Balardeta et al.

(10) Patent No.: US 7,801,575 B1
(45) Date of Patent: Sep. 21, 2010

(54) METHOD AND SYSTEM FOR SHOT TRACKING

(75) Inventors: Joseph Balardeta, Encinitas, CA (US); Scott Denton, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 12/728,056

(22) Filed: Mar. 19, 2010

(51) Int. Cl.
*H04B 1/38* (2006.01)
*H04M 1/00* (2006.01)

(52) U.S. Cl. ............... 455/574; 455/41.1; 455/41.2; 455/575.1; 340/7.32; 340/7.63; 340/10.1; 340/568.6; 473/131; 473/151; 473/222

(58) Field of Classification Search .......... 455/41.1, 455/41.2, 574, 575.1, 90.3, 100; 340/7.32, 340/7.63, 10.1, 568.6, 572.1, 572.8; 473/131, 473/151, 222
See application file for complete search history.

(56) References Cited

U.S. PATENT DOCUMENTS

| 5,619,076 | A | * | 4/1997 | Layden et al. ............... 307/48 |
| 5,993,323 | A | * | 11/1999 | Linenfelser ................. 473/209 |
| 6,431,122 | B1 | * | 8/2002 | Westrick et al. ............. 119/721 |
| 2008/0001720 | A1 | | 1/2008 | Tuttle |
| 2008/0147211 | A1 | | 6/2008 | Teller |
| 2010/0045443 | A1 | | 2/2010 | Steeves |
| 2010/0060428 | A1 | * | 3/2010 | Lee et al. .................. 340/10.1 |
| 2010/0144456 | A1 | * | 6/2010 | Ahern ....................... 473/222 |

* cited by examiner

*Primary Examiner*—Tuan A Pham
(74) *Attorney, Agent, or Firm*—Michael A. Catania

(57) ABSTRACT

The present invention relates to a system for transmitting a signal while conserving battery power by utilizing a resistor in series with a power source prior to a capacitor, allowing that capacitor to be charged at a controlled rate and further comprising an automatic switch, allowing power to flow when desired.

1 Claim, 8 Drawing Sheets

METHOD AND SYSTEM FOR SHOT TRACKING

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a circuit for transmitting a RFID signal while conserving battery power. More specifically, the present invention relates to a system for transmitting a signal while conserving battery power by utilizing a resistor in series with a power source prior to a capacitor, allowing that capacitor to be charged at a controlled rate and further comprising an automatic switch, allowing power to flow when desired.

2. Description of the Related Art

Golf clubs combine with the players swing to propel a ball toward a favored location and through a favored path. The orientation and speed of the club head at impact largely determines the ball path including carry distance and roll.

The prior art is lacking in a method and system for shot tracking wherein a RFID signal is transmitted in addition to conserving battery power.

BRIEF SUMMARY OF THE INVENTION

The present invention is novel in that the circuitry comprises components positioned such that a RFID signal may be transmitted while battery power is conserved.

The present invention comprises a circuit for a shot tracking device for attachment to, a grip of a golf club. The shot tracking device comprises a housing, a battery disposed within the housing and a circuit board disposed within the housing. In one embodiment, the housing may comprise a main body and a projection body extending downward from the main body. The circuit board has a first side and a second side. A sensor s disposed on the circuit board and a plurality of board components are disposed on the first side and the second side of the circuit board. The plurality of board components includes a microprocessor. The shot tracking device transmits a signal when the golf club strikes an object. The signal comprises the identification of the golf club.

This invention is a method for conserving power for a shot tracking device attached to the grip of a golf club. The method comprises striking an object with the golf club having a shot tracking device. The shot tracking device comprises a housing, a battery in electrical communication with a resistor which is in electrical communication with a load switch. The load switch is in electrical communication with an enabler and a microprocessor. The microprocessor is in electrical communication with a radiofrequency circuit.

The load switch is closed with allows power to flow to the microprocessor and the radiofrequency circuit. The power is drawn from the capacitor. A signal is transmitted from the radiofrequency circuit and a confirmation signal is received at the radiofrequency circuit. The load switch is opened and the capacitor is recharged at a controlled rate.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
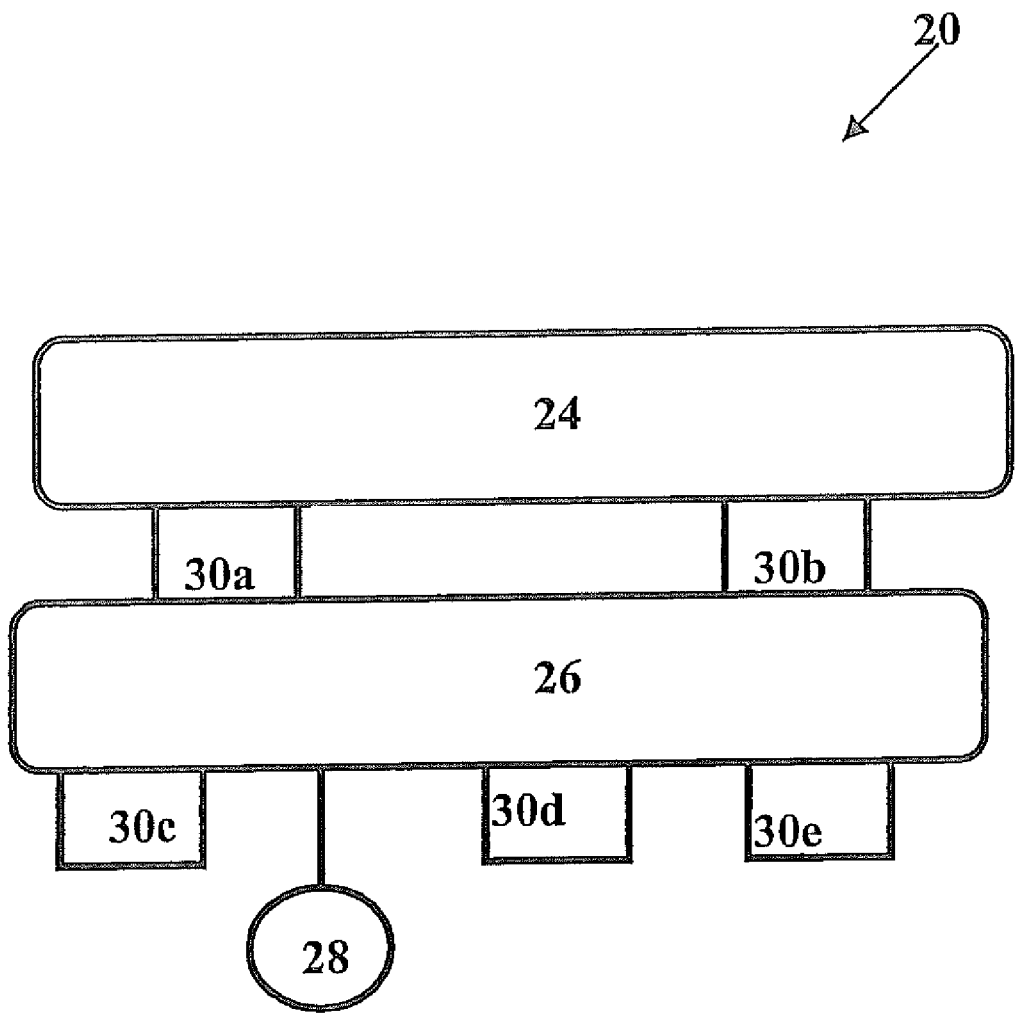
FIG. 1 is a perspective view of components of a system for shot tracking.

FIG. 1. shows components of the system which can be attached to a golf club. Alternatively, the components can be integrated into a golf club.

Figure 2:
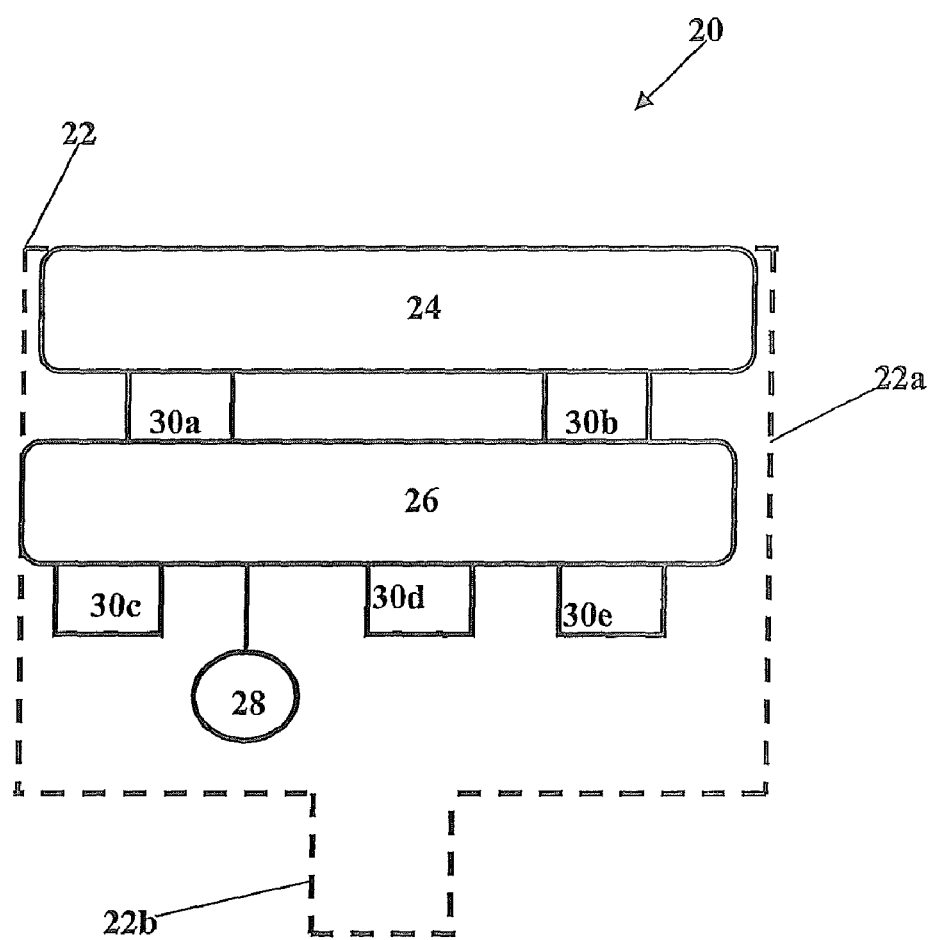
FIG. 2 is a perspective view of components of a system for shot tracking, including the main body and projection body extending downward.

FIG. 2 shows the components of a system for shot tracking, including the main body of the housing and a projection extending downward.

Figure 3:
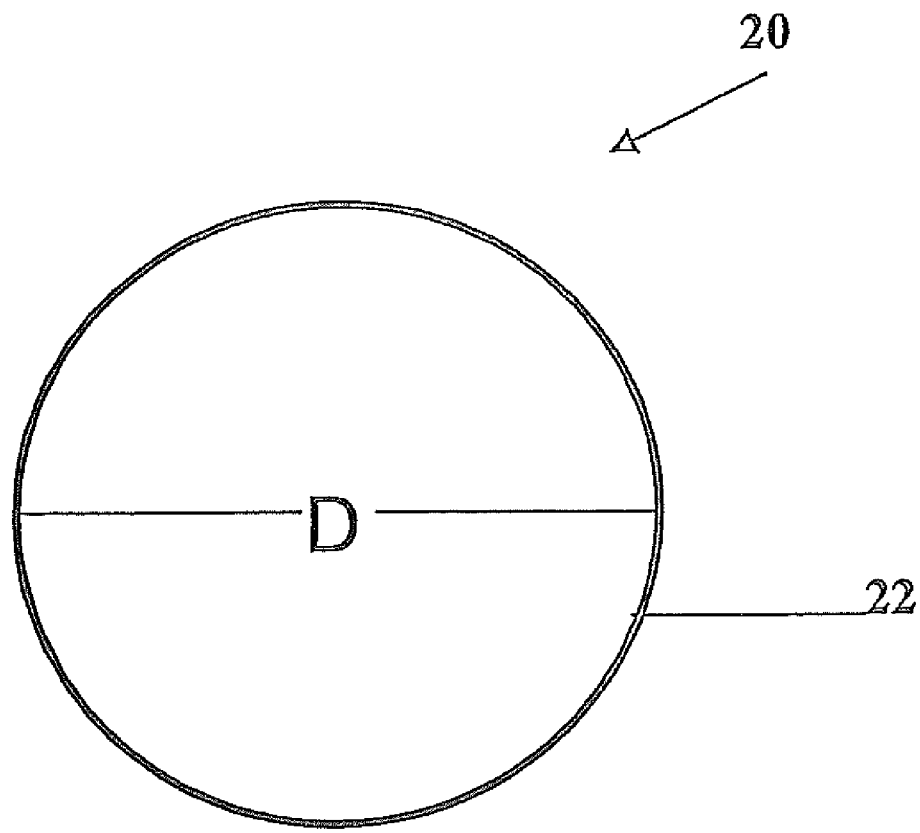
FIG. 3 is a perspective view of the shot tracking device and the housing component.

FIG. 3 shows the housing component of the shot tracking device and illustrates the diameter.

Figure 4:
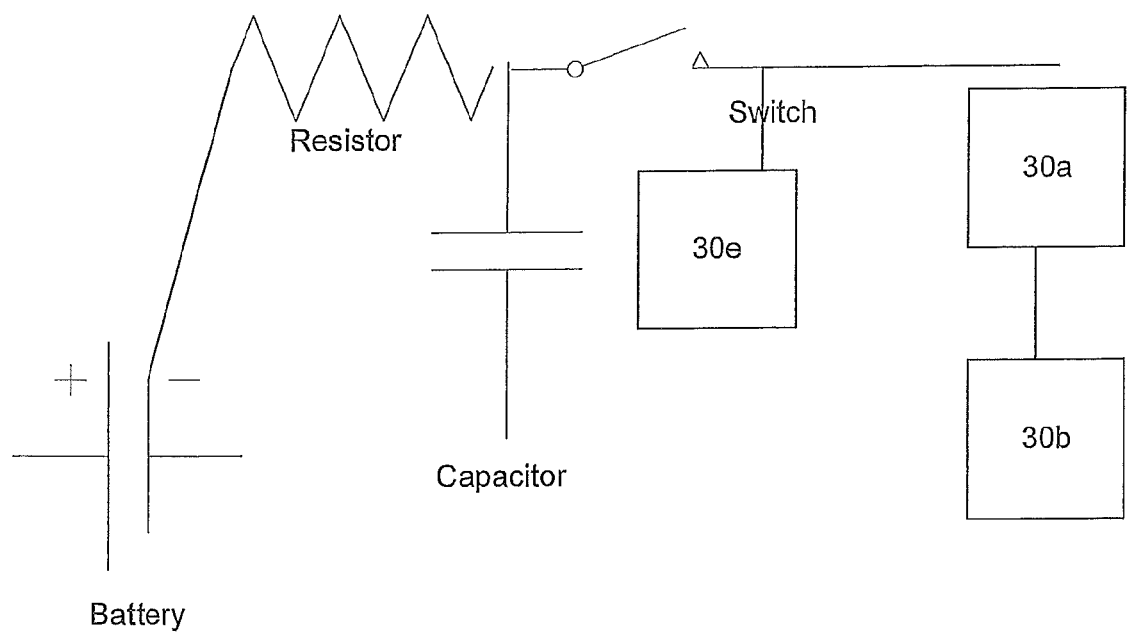
FIG. 4 is an illustration of the circuit diagram of the components of a system for shot tracking.

FIG. 4 illustrates a circuit diagram of the present invention. The components of the system 20 within the golf club 50 preferably include a power source, such as a battery 24, a microprocessor 30(a), an RFID component 30(b), a capacitor 30(c), a resistor 30(d), and an enabler 30(e).

Figure 5:
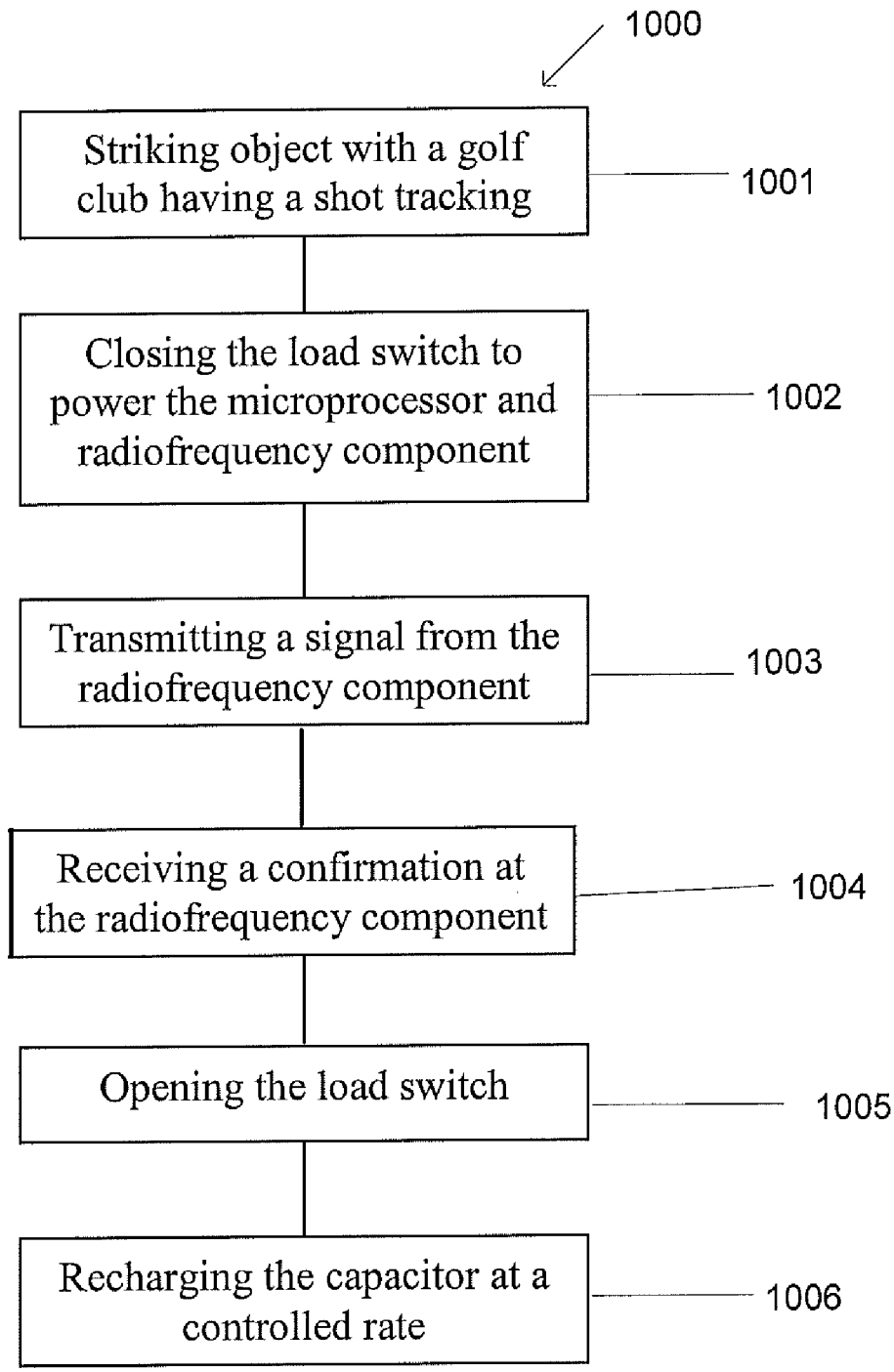
FIG. 5 is a flow chart of a method of conserving power for the shot tracking device.

FIG. 5 is a flow chart of a method 1000 for conserving power for the shot tracking device 20. At block 1001, an object is struck using the golf club having the shot tracking device. At block 1002, the load switch is closed to power the microprocessor and the radiofrequency circuit. At block 1003, a signal is transmitted from the radiofrequency circuit. At block 1004, a confirmation signal is received at the radiofrequency circuit. At block 1005, the load switch is opened and at block 1006, the capacitor is recharged at a controlled rate.

Figure 6:
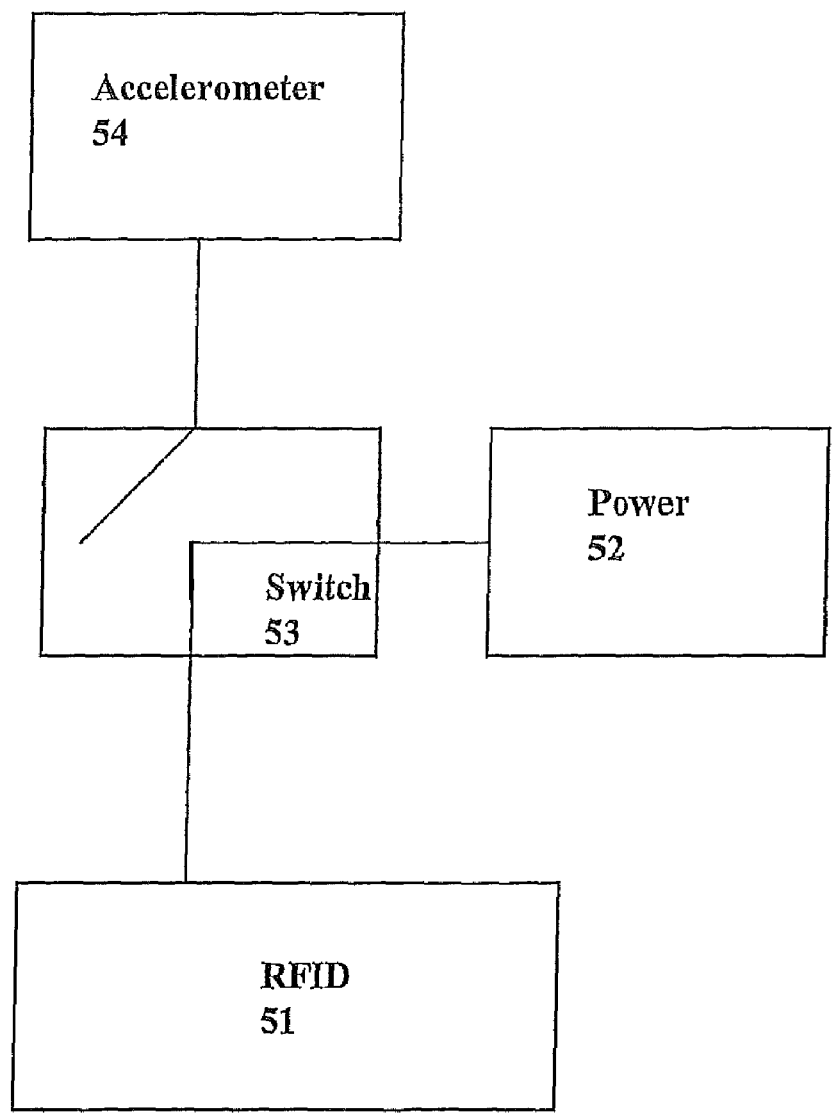
FIG. 6 is a block diagram of components of a system for shot tracking with the switch open.

FIG. 6 illustrates the components of the system located within a golf club prior to impact of a golf club with a golf ball. The components of the system 20 within the golf club 50 preferably include an active RED transponder 51, a power source 52, a switch 53 and an accelerometer 54. Those skilled in the pertinent art will recognize that the accelerometer 54 and switch 53 may be a single device.

Figure 7:
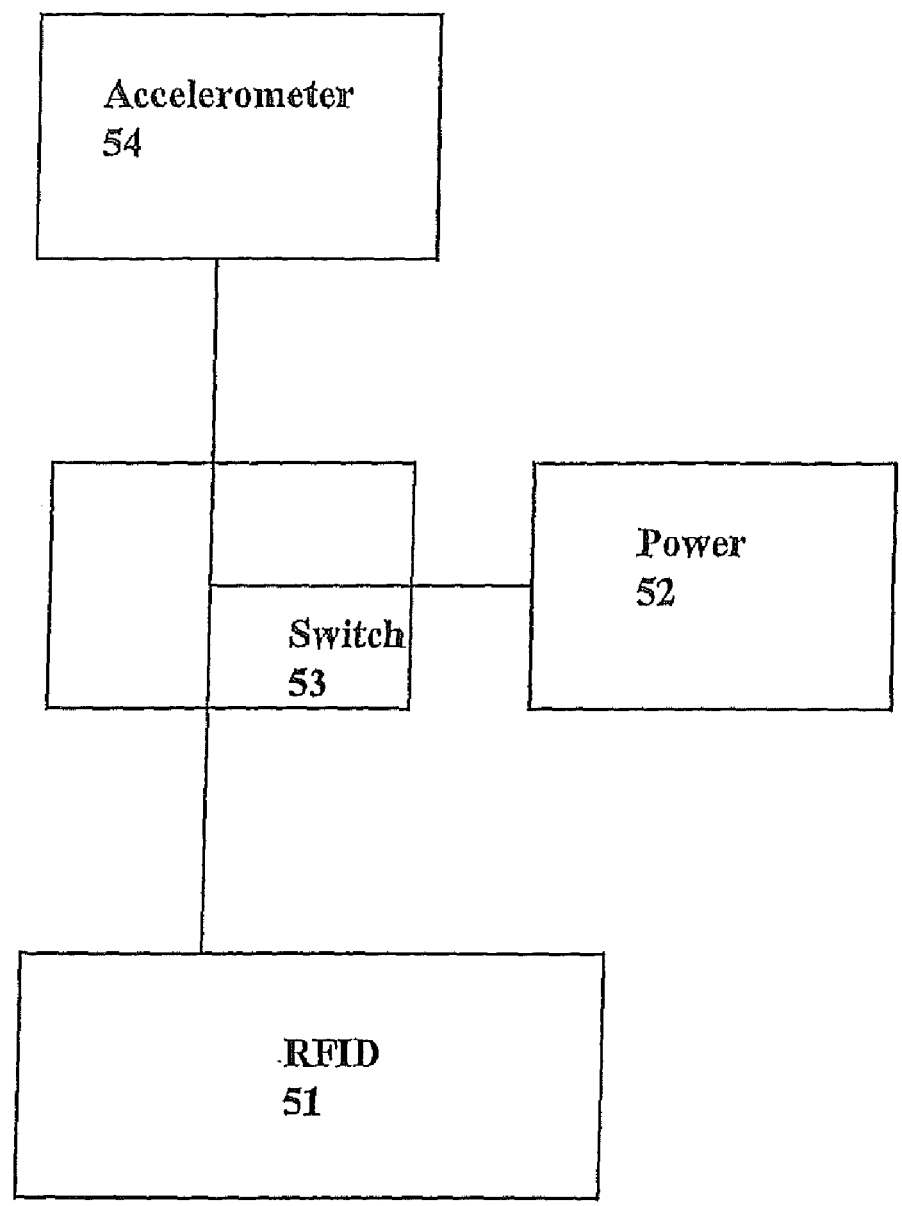
FIG. 7 is a block diagram of components of a system for shot tracking with the switch closed.

FIG. 7 illustrates components of the system located within a golf club subsequent to impact of a golf club with a golf ball.

Figure 8:
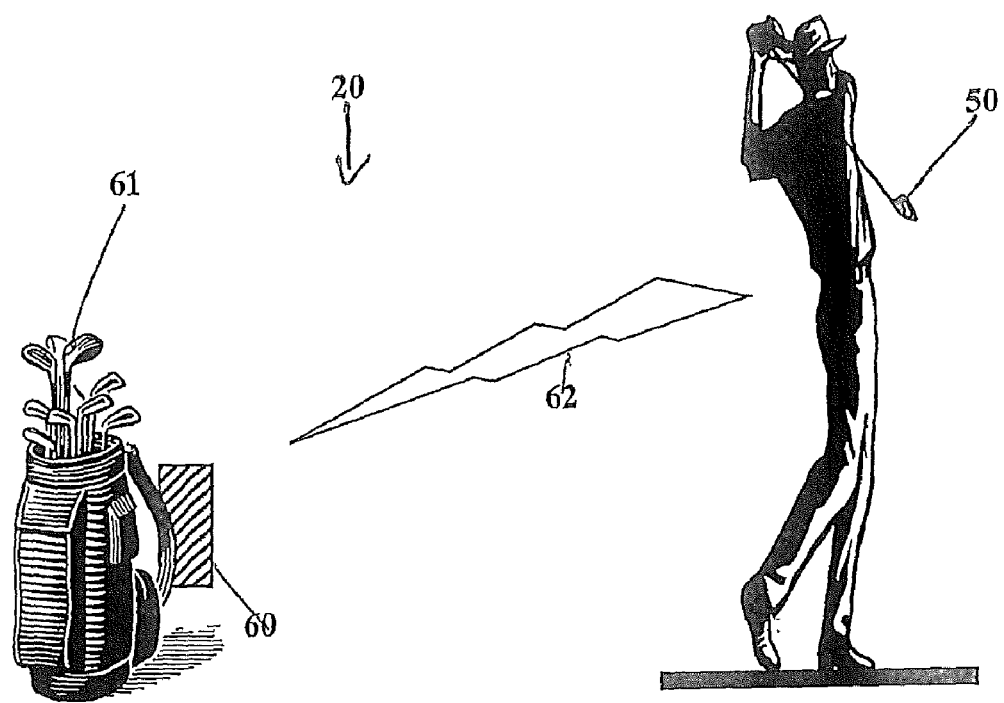
FIG. 8 is an illustration of a system for shot tracking.

FIG. 8 illustrates the system 20. A transponder in a golf club 50 swung by a golfer sends a signal 62 to a receiver 60. The receiver is attached to a golf bag 61, however, those skilled within the pertinent art will recognize that the receiver may be attached to any pertinent device including the golfer, or may stand alone.

In a preferred embodiment of the present invention, a shot tracking device 20 for attachment to a golf club 50 comprises a housing 22, a battery 24 disposed within the housing and a circuit board 26 disposed within the housing 22. A sensor 28 is disposed on the circuit board 26. A plurality of components 30 are disposed on both the first and second side of the circuit board 26. The shot tracking device 20 transmits a signal 62 when the golf club 50 strikes a golf ball and the signal 62 comprises the identification of the golf club 50.

The plurality of components, disposed on the circuit board 26, include a microprocessor 30(a), an RFID component 30(b), a capacitor 30(c), a resistor 30(d) and an enabler 30(e). In one embodiment, the sensor 28 is a shock switch. The housing 22 preferably comprises a main body 22(a) and a projection body 22(b). The projection body 22(b) preferably has a length that ranges from 5 mm to 1 mm. The housing 22 preferably has a diameter, D, that ranges from 20 mm to 25 mm. The battery 24 is preferably a 3 volt battery.

The circuit 26 for transmitting a RFID signal 62 while conserving battery power comprises a battery 24 in electrical communication with a resistor 30(d), wherein the battery 24 is a three volt battery and the resistor 30(d) controls the rate at which the capacitor 30(c) is charged. The resistor 30(d) is in electrical communication with the capacitor 30(c) and a load switch 30(f). The capacitor 30(c) is preferably a 1 micro Faraday capacitor. The load switch 30(f) is in electrical communication with the microprocessor 30(a), wherein when the load switch 30(f) is closed, current drawn from the capacitor 30(c) is allowed to flow to the microprocessor 30(a). The microprocessor 30(a) is in electrical communication with a radiofrequency component 30(b), wherein a signal 62 is transmitted from the radiofrequency component 30(b) and a confirmation signal is received at the radiofrequency component 30(b), wherein the radiofrequency component 30(b) operates at 2.5 giga-Hertz. A peak current of transmission of the signal is limited to 2 milliamps.

The plurality of board components 30 includes a microprocessor 30(a). The shot tracking device 20 transmits a signal 62 when the golf club 50 strikes an object. The signal 62 comprises the identification of the golf club 50.

The present invention further comprises a method for conserving power for a shot tracking device 20 attached to the grip of a golf club 50. The method comprises striking an object with the golf club 50 having a shot tracking device 20. The shot tracking device comprises 20 a housing 22, a battery 24 in electrical communication with a resistor 30(d) which is in electrical communication with a capacitor 30(c) and a load switch 53. The load switch 53 is in electrical communication with an enabler 30(e) and a microprocessor 30(a). The microprocessor 30(a) is in electrical communication with a radiofrequency component 30(b).

When the load switch 53 is closed, power 52 flows to the microprocessor 30(a) and the radiofrequency component 30(b). The power 52 is drawn from the capacitor 30(c). A signal 62 is transmitted from the radiofrequency component 30(b) and a confirmation signal 62 is received at the radiofrequency component 30(b). The load switch 53 is opened and the capacitor 30(c) is recharged at a controlled rate.

The peak current for transmission of the signal 62 is preferably limited to 2 milliamps. The radiofrequency component 30(b) preferably operates at 2.4 giga-Hertz. Preferably, the microprocessor 30(a) and the radiofrequency component 30(b) are integrated. The capacitor 30(c) is preferably a 1 micro-Faraday capacitor.

A preferred microprocessor 30(a) is a CYRF69103 provided by Cypress Perform. This microprocessor is a complete Radio System-on-Chip device, providing a complete RF system solution with a single device a few components. The microprocessor contains a 2.4 GHz Mbps GFSK radio transreceiver, packet data buffering, packet framer, DSSS baseband controller, Received Signal Strength Indication (RSSI), and SPI interface for date transfer and device configuration.

A preferred load switch 53 is a AP2280 provided by Diodes Inc., which is a single channel slew rate controlled load switch. The AP2280 load switch has a quiescent supply current that is typically only 0.004 micro-amps, making it ideal for battery powered distribution system where the power consumption is a concern.

In an alternative embodiment of the present invention, the shot tracking device 20 comprises a housing 22 with a main body 22(a) and a projection body 22(b) extending downward from the main body 22(a). A battery 24 is disposed within the housing 22 and a circuit board 26 is disposed within the housing 22 and below the battery 24. The circuit board 26 is double sided, and has a shock switch disposed on the second side. A plurality of components 30, including a microprocessor 30(a), an RFID component 30(b), a capacitor 30(c), a resistor 30(d), and an enabler 30(e), are disposed on both the first and second side of the circuit board 26. The shot tracking device 20 transmits a signal 62 when the golf club 50 strikes a golf ball, the signal 62 comprising an identification of the golf club 50.

The plurality of board components 30 includes a microprocessor 30(a). The microprocessor 30(a) is configured to deactivate transmissions of the signal 62 when a threshold number of signals are transmitted by the shot tracking device 20 and a receipt signal is not received by the shot tracking device 20. The threshold number of signals ranges from 5 to 50. The threshold number of signals preferably ranges from 10 to 40, more preferably from 15 to 30 and is most preferred to be 20. Each signal transmitted consumes approximately 2 milliamps of power. The signal comprises a frequency of approximately 2.4 GHz.

Preferably, the housing 22 is a rubberized material formed around the battery 24, the circuit board 26, the sensor 28 and the plurality of chips. Alternatively, the housing 22 is an epoxy material formed around the battery 24, the circuit board 26, the sensor 28 and the plurality of board components 30.

The battery 24 is preferably a CR1620 having at least 75 milliamps of power. Alternatively, the battery is a 3 volt battery. Preferably, the sensor 28 is a shock switch. The housing 22 preferably has a diameter, D, that ranges from 20 mm to 25 mm. The projection body 22(b) preferably has a length that ranges from 5 mm to 10 mm.

The receiver is preferably a GPS device such as disclosed in Balardeta et al., U.S. Patent Publication Number 20090075761 for a Golf GPS Device And System, which is hereby incorporated by reference in its entirety. Alternatively, the receiver is a personal digital assistant (PDA), "smart phone", mobile phone, or other similar device. However, those skilled in the pertinent art will recognize that the receiver may be any device capable of receiving and storing signals from the RFID tag.

Gibbs, et al., U.S. Pat. No. 7,163,468 is hereby incorporated by reference in its entirety.

Galloway, et al., U.S. Pat. No. 7,163,470 is hereby incorporated by reference in its entirety.

Williams, et al., U.S. Pat. No. 7,166,038 is hereby incorporated by reference in its entirety.

Desmukh U.S. Pat. No. 7,214,143 is hereby incorporated by reference in its entirety.

Murphy, et al., U.S. Pat. No. 7,252,600 is hereby incorporated by reference in its entirety.

Gibbs, et al., U.S. Pat. No. 7,258,626 is hereby incorporated by reference in its entirety.

Galloway, et al., U.S. Pat. No. 7,258,631 is hereby incorporated by reference in its entirety.

Evans, et al., U.S. Pat. No. 7,273,419 is hereby incorporated by reference in its entirety.

Hocknell, et al., U.S. Pat. No. 7,413,250 is hereby incorporated by reference in its entirety.

The measurements may be inputted into an impact code such as the rigid body code disclosed in U.S. Pat. No. 6,821,209, entitled Method for Predicting a Golfer's Ball Striking Performance, which is hereby incorporated by reference in its entirety.

The swing properties are preferably determined using an acquisition system such as disclosed in U.S. Pat. No. 6,431,990, entitled System and Method for Measuring a Golfer's Ball Striking Parameters, assigned to Callaway Golf Company, the assignee of the present application, and hereby incorporated by reference in its entirety. However, those skilled in the pertinent art will recognize that other acquisition systems may be used to determine the swing properties.

Other methods that are useful in obtaining a golfer's swing characteristics are disclosed in U.S. Pat. No. 6,638,175, for a Diagnostic Golf Club System, U.S. Pat. No. 6,402,634, for an Instrumented Golf Club System And Method Of Use, and U.S. Pat. No. 6,224,493, for an Instrumented Golf Club System And Method Of Use, all of which are assigned to Callaway Golf Company, the assignee of the present application, and all of which are hereby incorporated by reference in their entireties.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A transponder for transmitting a RFID signal for shot tracking a golfer's round of golf while conserving battery power, the transponder comprising:

a battery in electrical communication with a resistor, wherein the battery is a three volt battery and the resistor controls the rate at which a capacitor is charged from the battery, the battery having 75 milli-amps hours of capacity;

the resistor in electrical communication with the capacitor and a load switch, wherein the capacitor is a one micro-Farad capacitor;

the load switch in electrical communication with a microprocessor, wherein when the load switch is closed, current drawn from the capacitor is allowed to flow to the microprocessor and radiofrequency component, wherein when the load switch is opened, the capacitor is recharged at a controlled rate and current does not flow to the microprocessor or the radiofrequency component, the load switch closed when a golf club strikes a golf ball, and the load switch with no impact transitions thus deactivating allowing the power to be conserved;

the microprocessor in electrical communication with a radiofrequency component, wherein a signal is transmitted from the radiofrequency component and a confirmation signal is received from a receiver at the radiofrequency component, wherein the signal comprises the identification of a golf club and the radiofrequency component operates at 2.4 giga-Hertz; wherein the microprocessor is configured to deactivate transmission of the signal when a threshold number of signals are transmitted by the shot tracking device and the confirmation signal is not received by the shot tracking device; and a housing for enclosing the transponder, wherein the housing comprises a main body and a projection body for insertion into a grip of the golf club head, wherein a peak current of transmission of the signal is limited to 2 milliamps.

* * * * *